United States Patent [19]

Roskott

[11] 4,376,841
[45] Mar. 15, 1983

[54] COPOLYMERIZATION OF UNSATURATED POLYESTER RESINS

[75] Inventor: Lodewijk Roskott, Gorssel, Netherlands

[73] Assignee: Akzona Incorporated, Asheville, N.C.

[21] Appl. No.: 787,123

[22] Filed: Apr. 13, 1977

[30] Foreign Application Priority Data

Apr. 26, 1976 [NL] Netherlands .................... 7604405

[51] Int. Cl.³ ...................... C08F 4/36; C08F 218/00; C08G 63/38
[52] U.S. Cl. ........................................ 525/23; 525/27
[58] Field of Search ....................... 260/861, 864, 866; 525/23, 27

[56] References Cited

U.S. PATENT DOCUMENTS

| | | | |
|---|---|---|---|
| 2,740,765 | 4/1956 | Parker | 260/870 |
| 3,159,690 | 12/1964 | Parker | 260/864 |
| 3,644,612 | 2/1972 | Meyer et al. | 260/865 |
| 3,853,967 | 12/1974 | Leveskis | 260/861 |
| 3,920,591 | 11/1975 | Jacobs et al. | 260/864 |
| 3,945,940 | 3/1976 | Leveskis | 260/861 |
| 3,950,432 | 4/1976 | Sanchez | 525/27 |
| 3,980,731 | 9/1976 | Willemse | 260/861 |
| 4,032,596 | 6/1977 | Uffner et al. | 260/864 |

FOREIGN PATENT DOCUMENTS

| | | |
|---|---|---|
| 1041040 | 9/1966 | United Kingdom . |
| 1258971 | 1/1972 | United Kingdom . |
| 1307484 | 2/1973 | United Kingdom . |

*Primary Examiner*—Allan Lieberman
*Attorney, Agent, or Firm*—Francis W. Young; Robert F. Green

[57] ABSTRACT

A process for copolymerizing unsaturated polyester resins is disclosed wherein said resin is copolymerized in the presence of a perketal and an acid or acid-releasing compound.

10 Claims, No Drawings

COPOLYMERIZATION OF UNSATURATED POLYESTER RESINS

BACKGROUND OF THE INVENTION

This invention relates to a process for the copolymerization of unsaturated polyester resins.

It is well known that the copolymerization of an unsaturated polyester and a reaction monomer may be initiated by many peroxidic initiators.

U.S. Pat. No. 2,740,765 describes the copolymerization of unsaturated polyester resins with the use of an organic peroxide, such as dibenzoyl peroxide, tertiary butyl hydroperoxide, cyclohexyl hydroperoxide, diacetyl peroxide, dilauroyl peroxide or cumene hydroperoxide, in the presence of a quaternary ammonium salt which is soluble in the resin and derived from a non-oxidizing acid which is at least as strong as acetic acid.

Also, U.S. Pat. No. 3,159,690 describes the peroxidic copolymerization of unsaturated polyester resins in the presence of an organic hydroperoxide and an amine salt derived from an acid having a strength which is at least equal to that of acetic acid. To the unsaturated polyesters described in the U.S. Pat. Nos. 2,740,765 and 3,159,690 inhibitors are added to prevent premature gelation.

SUMMARY OF THE INVENTION

It has been discovered that unsaturated polyester resins also may be polymerized by utilizing a combination of a perketal and an acid component which may be either an acid or an acid-releasing compound. Surprisingly, it has been found that if the acid or the acid-releasing compound is used in combination with the perketal, the accelerating effect of the acid or acid-releasing compound is many times that obtained by utilizing organic peroxides, such as hydro-peroxides, diacryl peroxides, aralkyl peroxides and peroxy esters which are mentioned in the foregoing U.S. patents.

Perketals may be described as reaction products of a ketone and a hydroperoxide and are well known compounds. Such compounds have the structure,

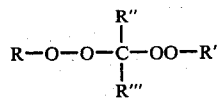

wherein R,R', R", and R''' are independently selected from the group consisting of substituted or unsubstituted alkyl and aralkyl radicals. The alkyl and aralkyl radicals generally contain from about 4 to about 12 carbon atoms and R" and R''', along with the central carbon atom may form a substituted or unsubstituted cycloalkyl group. Any substituent may be present so long as it does not dominate the alkyl or aralkyl or cycloalkyl nature of the radical to which it is attached.

The combination initiator according to the invention is not only suitable for the copolymerization of unsaturated polyester resins at the typical reaction temperatures in the range of about 60° to about 100° C., but also at lower reaction temperatures in the range of about 18° to about 25° C. The use of the disclosed combination initiator, moreover, has the advantage that the resulting copolymerized polyester resins do not discolor.

DESCRIPTION OF THE PREFERRED EMBODIMENTS

Although any perketal is suitable in the process of the present invention, the preferred perketals have the general formula:

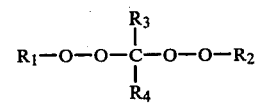

wherein $R_1$ and $R_2$ are independently selected from the group consisting of tertiary butyl, tertiary amyl, cumyl, and 2,4,4-trimethylpentyl-2, and $R_3$ and $R_4$ are independently selected from the group consisting of substituted or unsubstituted alkyl radicals having from about 1 to about 18 carbon atoms, and aralkyl radicals having from about 7 to about 15 carbon atoms, or $R_3$ and $R_4$ together with the central carbon atom may represent a substituted or unsubstituted cycloalkyl group, having from about 5 to about 16 carbon atoms in the ring.

Examples of especially preferred perketals are 1,1-ditertiary butyl peroxy cyclohexane; 2,2-ditertiary butyl peroxy butane; 2,2-ditertiary butyl peroxy -4- methyl pentane; 2,2-dicumylperoxy propane; 2,2-ditertiary butyl peroxy valeric -n-butyl ester; 1,1-bis(2,4,4-trimethyl-pentyl-2-peroxy) cyclohexane.

The perketals to be used in the process according to the invention may be incorporated into the unsaturated polyester resin in amounts from about 0.1 to about 10%, by weight, preferably in an amount from about 0.2 to about 2%, by weight, calculated on the total weight of the unsaturated polyester resin.

Acids which may be incorporated into the unsaturated polyester resin along with a perketal are Brønsted acids having a $pK_a$ value less than or equal to that of formic acid, 3.6 at 19.5° C., such as hydrochloric acid, sulphuric acid, nitric acid, phosphoric acid, trichloroacetic acid, paratoluene sulphonic acid, and Lewis acids or metal halides with Lewis acid properties, such a barium fluoride and the chlorides of iron, cobalt, zinc and aluminium. The acid-forming compounds which may be used in the process according to the present invention are compounds which upon being subjected to solvolysis, with heating or UV radiation, will release a Brønsted acid having a $pK_a$ less than that of formic acid. Examples of such compounds which are especially preferred are; triphenyl sulphonium chloride, trialkyl benzyl ammonium chloride, benzoyl chloride, o-methyl benzoyl chloride, cumyl chloride, 1,4-bis (α-choroisopropyl) benzene.

The acids or acid-forming compounds to be used according to the invention may be incorporated in the polyester resin in amounts by weight, from about 0.001 to about 5%, preferably in amounts, by weight, from about 0.01 to about 1.0%, all calculated on the total of the unsaturated polyester resin.

Although a great many combinations of perketals and acid or acid-forming compounds are suitable, it is generally preferred to employ a combination of a perketal and a compound which upon being heated or subjected to UV radiation will release a Brønsted acid. It has been found that an unsaturated polyester resin containing such a combination has good storage stability. Examples of the especially preferred combinations are trialkyl benzyl ammonium chloride, triphenyl sulphonium chloride, benzoyl chloride, dimethylamine hydrochloride, or 1,4-bis (α-choroisopropyl) benzene with 2,2-dicumyl peroxy propane; 1,1-ditertiary butyl peroxy cyclohexane; 2,2-ditertiary butyl peroxy valeric -n- butyl ester; or 1,1-bis(2,4,4-trimethylpentyl-2-peroxy)-cyclohexane. Of course, mixtures of one or more acid components with one or more perketals may always be employed.

Any unsaturated polyester resin may be used in the practice of this invention. Typically, unsaturated polyester resins may be obtained by dissolving unsaturated polyesters in reactive monomers containing one or more polymerizable $CH_2=C<$ groups, such as styrene, vinyl toluene, methyl methacrylate, diallyl phthalate, and divnyl benzene.

The unsaturated polyester may be obtained, for example, by the condensation of approximately equivalent amounts of a polyvalent alcohol, such as ethylene glycol, propylene glycol, or diethylene glycol with an unsaturated dibasic carboxylic acid, such a maleic acid, fumaric acid, or itaconic acid, in the presence, if desired, of a saturated acid, such as phthalic acid, isophthalic acid, tetrachlorophthalic acid, malonic acid, adipic acid, sebacic acid, succimic acid or the like.

Usually, the percentage of reactive monomer in the solution of polyester and monomer is from about 30% to about 70%, by weight, 50% being typical.

The invention will be further described in the following non-limiting Examples. The term "standard resin" used in said Examples means a resin obtained by dissolving 65 parts, by weight, of an unsaturated polyester obtained by polycondensation of 1 mole of maleic anhydride, 1 mole of phthalic anhydride, 1.1 moles of propylene glycol and 1 mole of diethylene glycol to an acid number of 30, in 35 parts, by weight, of styrene, to which solution 0.012 percent by weight of hydroquinone was added to prevent premature gelation.

The peak temperature, curing and gel times were determined at an elevated temperature in accordance with the procedure described in the reprint of the 16th Annual Conference Reinforced Plastics Division Society of the Plastics Industry Inc. 1961. "SPI Procedure for Running Exotherm Curves-Polyester Resins".

The gel times, curing times and peak temperatures were determined as follows:

25 grams of the standard resin, to which the peroxide and acid component had been added in the amounts indicated in the Examples, were poured into a capillary tube having an inside diameter of 19 mm. Subsequently, the capillary tube filled with resin was placed in a water bath of 20° C. The temperature in the resin was measured with the aid of a time-temperature recorder connected to an iron-constant thermocouple.

The time elapsed between preparing the resin mixture and reaching a temperature of 25° C. in the resin mixture is referred to as the gel time, and the time elapsed between preparing the resin mixture and reaching the peak temperature in the resin mixture is called the curing time. Peak temperature means the highest temperature reached in the resin mixture.

EXAMPLE I

To 100 parts, by weight, of a standard resin there was added, with vigorous stirring, 1 part by weight of 1,1-ditertiary butylperoxy-3,3,5-trimethyl cyclohexane. Subsequently, 0.05 parts, by weight, of hydrochloric acid were incorporated into the mixture. Of the resulting composition the gel time, the minimum curing time, and the peak temperature were measured at a temperature of 20° C. The same measurements were carried out on compositions containing different amounts by weight of hydrochloric acid and/or peroxides. The compositions used in the measurements and the results obtained are listed in Table I.

TABLE I

| Peroxide: 1 part by weight per 100 parts by weight of unsaturated polyester resin | hydrochloric acid parts by weight | gel time (min) | minimum curing time (min) | peak temperature (°C.) |
|---|---|---|---|---|
| 1,1-ditertiary butyl peroxy 3,3,5-trimethyl cyclohexane | 0.05 | 2.5 | 5.3 | 95 |
|  | 0.01 | 2.5 | 4.0 | 207 |
| 2,2-ditertiary butyl peroxy 4-methyl pentane | 0.05 | 1.0 | 17.1 | 46 |
|  | 0.01 | 0.8 | 2.3 | 81 |
| 2,2-ditertiary butyl peroxy butane | 0.05 | 3.1 | 5.9 | 101 |
|  | 0.01 | 2.4 | 4.4 | 152 |
| 4,4-ditertiary butyl peroxy valeric n-butyl ester | 0.05 | 8.5 | 14.7 | 73 |
|  | 0.01 | 19.0 | 29.0 | 114 |
| 1,1-bis [4,4-trimethyl pentyl -2-peroxy] cyclohexane | 0.05 | 1.6 | 12.1 | 89 |
|  | 0.01 | 1.7 | 12.2 | 163 |
| cumyl hydroperoxide | 0.05 | 120 | | |
|  | 0.01 | 120 | | |
| tertiary butyl hydroperoxide | 0.05 | 120 | | |
|  | 0.01 | 120 | | |
| tertiary butyl peroxy benzoate | 0.05 | 120 | | |
|  | 0.01 | 120 | | |
| tertiary butyl peroxy-2-ethyl | 0.05 | 120 | | |
|  | 0.01 | 120 | | |
| dibenzoyl peroxide | 0.05 | 120 | | |
|  | 0.01 | 120 | | |
| tertiary butyl cumyl peroxide | 0.05 | >120 | | |
|  | 0.01 | >120 | | |
| ditertiary butyl peroxide | 0.05 | >120 | | |
|  | 0.01 | >120 | | |

The contents of Table I clearly demonstrate the superiority of using the combination initiators of the present invention over an initiator system comprised of an acid component and a peroxide or hydroperoxide, such as cumyl hydroperoxide, tertiary butyl hydroperoxide, tertiary butyl peroxy benzoate, tertiary butyl cumyl peroxide or ditertiary butyl peroxide, rather than a perketal.

EXAMPLE II

To 100 parts by weight of a standard resin there was added, with vigorous stirring, 1 part by weight of 1,1-ditertiary butyl peroxy-3,3,5-trimethyl hexane. Subsequently, 0.05 parts by weight of hydrochloric acid (+) were introduced into the mixture. Of the resulting composition the gel time, the minimum curing time and the peak temperature were measured at 60° C. The same measurements were carried out on compositions which did not contain hydrochloric acid (−) and/or other peroxides. The compositions subject to the measurements, the bath temperature and the results obtained are listed in Table II.

TABLE II

| Composition peroxide | HCL | temp. (°C.) | gel time (min.) | minimum curing time (min.) | peak temp. (°C.) |
|---|---|---|---|---|---|
| 1,1-ditertiary butyl peroxy-3,3,5-trimethyl | − | 60 | 61.6 | 78.0 | 117 |
|  | + | 60 | 0.03 | 0.2 | 201 |
| 2,2-ditertiary butyl peroxy-4-methyl pentane | − | 60 | 34.5 | 43.2 | 194 |
|  | + | 60 | 0.03 | 0.18 | 199 |
| 2,2-ditertiary butyl peroxy butane | − | 70 | 35.8 | 42.8 | 217 |
|  | + | 70 | 0.05 | 0.35 | 219 |
| 4,4-ditertiary butyl peroxy baleric | − | 80 | 36.3 | 45.2 | 216 |
|  | + | 80 | 0.37 | 1.09 | 224 |

TABLE II-continued

| Composition peroxide | HCL | temp. (°C.) | gel time (min.) | minimum curing time (min.) | peak temp. (°C.) |
|---|---|---|---|---|---|
| n-butyl ester | | | | | |
| cumyl hydro- | − | 80 | 12.8 | 25.1 | 141 |
| peroxide | + | 80 | 7.3 | 12.4 | 202 |
| tertiary butyl peroxy | − | 80 | 34.0 | 46.8 | 202 |
| benzoate | + | 80 | 12.0 | 16.6 | 206 |
| tertiary butyl peroxy | − | 60 | 47.9 | 52.5 | 210 |
| | + | 60 | 12.9 | 15.8 | 217 |
| dibenzoyl peroxide | − | 60 | 59.4 | 65.3 | 193 |
| | + | 60 | 49.7 | 56.1 | 187 |
| tertiary butyl cumyl | − | 100 | 15.5 | 18.9 | 243 |
| peroxide | + | 100 | 14.2 | 19.1 | 231 |
| dibert. butyl | − | 100 | 24.7 | 29.0 | 240 |
| peroxide | + | 100 | 51.0 | 55.7 | 238 |

The contents of Table II also clearly demonstrate the superiority of using the combination initiators of the present invention over an initiator system employing only a perketal (without an acid component) or a peroxide or hydroperoxide (not a perketal), both with or without an acid component. Thus, the combination initiators of the present invention demonstrated gel times of from about 0.03 to about 0.37 minutes and minimum curing times of from about 0.18 to about 1.09 minutes, whereas the initiator systems not within the scope of the invention demonstrated gel times of from about 7.3 to about 61.6 minutes and minimum curing times of from about 12.4 to about 78.0 minutes.

EXAMPLE III

To 100 parts by weight of a standard resin there was added, with vigorous stirring, 1 part by weight of 1,1-ditertiary butyl peroxy-3,3,5-trimethyl cyclohexane. Subsequently, 0.110 parts by weight of hydrobromic acid were taken up in the mixture. Of the resulting composition the gel time, the minimum curing time and the peak temperature were measured at 20° C. The same measurements were carried out on compositions containing the same amount by weight of hydrobromic acid but with 1 part by weight of a peroxide other than 1,1-ditertiary butyl peroxy-3,3,5-trimethyl cyclohexane. The compositions used in the measurements and the results obtained are listed in Table III.

TABLE III

| Compositions Peroxide | hydro- bromic acid | Gel time (min.) | Minimum curing time (min.) | Peak temp. (°C.) |
|---|---|---|---|---|
| 1,1-ditertiary butylperoxy-3,3,5-trimethyl cyclohexane | + | 1.6 | 10.5 | 37 |
| 2,2-ditertiary butylperoxy 4-methyl pentane | + | 3.0 | 6.2 | 27 |
| 2,2-ditertiary butylperoxy butane | + | 2.8 | 5.9 | 31 |
| 4,4-ditertiary butylperoxy valeric-n-butyl ester | + | 2.7 | 11.9 | 30 |
| cumyl hydroperoxide | + | >120 | | |
| tertiary butyl peroxy benzoate | + | >120 | | |
| tertiary butyl peroxy-2-ethyl-hexanoate | + | >120 | | |
| dibenzoyl peroxide | + | >120 | | |
| tertiary butyl cumyl peroxide | + | >120 | | |
| ditertiary butyl peroxide | + | >120 | | |
| tertiary butylhydroperoxide | + | >120 | | |

The contents of Table III demonstrate the advantageous gel times obtained by employing the initant invention, over other initiator systems. The combination initiators of the present invention, comprised of a perketal and an acid component, demonstrate gel times of from about 1.6 to 3.0 minutes, whereas systems employing a peroxide or hydroperoxide (other than a perketal) with the same acid component (hydrogen bromide) demonstrate gel times in excess of 120 minutes.

EXAMPLE IV

To 110 parts by weight of a standard resin there were successively added, with vigorous stirring, 1 part by weight of 1,1-ditertiary butyl peroxy-3,3,5-trimethyl cyclohexane, and 0.110 parts by weight of hydrobromic acid. Of the resulting composition the gel time, the minimum curing time and the peak temperature were determined at 60° C. The same measurements were carried out on compositions which contained no hydrobromic acid (−) and/or other peroxides. The compositions used in the measurements, the bath temperatures and the results obtained are listed in Table IV.

TABLE IV

| Composition peroxide | hydro- bromic acid | temp (°C.) | gel time (min.) | minimum curing time (min.) | peak temp (°C.) |
|---|---|---|---|---|---|
| 1,1-ditertiary butyl peroxy-3,3,5-trimethyl cyclohexane | + | 60 | 0.2 | 1.9 | 139 |
| | − | 60 | 61.6 | 78.0 | 117 |
| 2,2-ditertiary butyl peroxy-4-methyl pentane | + | 60 | 0.2 | 1.7 | 188 |
| | − | 60 | 34.5 | 43.2 | 194 |
| 2,2-ditertiary butyl peroxy butane | + | 70 | 0.73 | 2.14 | 210 |
| | − | 70 | 35.8 | 42.8 | 217 |
| 4,4-ditertiary butyl peroxy-valeric | + | 80 | 0.21 | 1.82 | 212 |
| | − | 80 | 36.3 | 45.2 | 216 |
| cumyl hydroperoxide | + | 80 | 3.3 | 10.8 | 180 |
| | − | 80 | 12.8 | 25.1 | 141 |
| tertiary butyl peroxybenzoate | + | 80 | 12.5 | 24.2 | 204 |
| | − | 80 | 34.0 | 46.8 | 202 |
| tertiary butyl peroxy-2-ethyl | + | 60 | 12.8 | 21.4 | 201 |
| | − | 60 | 47.9 | 52.5 | 210 |
| dibenzoyl peroxide | + | 60 | 46.4 | 51.2 | 193 |
| | − | 60 | 59.4 | 65.3 | 193 |
| ditertiary butyl peroxide | + | 100 | 44.8 | 50.2 | 239 |
| | − | 100 | 24.7 | 29.0 | 240 |

The contents of Table IV show that the initiator system of the present invention yields advantageous gel and minimum curing times, from about 0.2 to about 0.21 minutes and from about 1.7 to about 2.14 minutes, respectively, whereas the initiator systems employing a peroxide or hydroperoxide (not a perketal) or a perketal with no acid component (hydrobromic acid) yield gel and minimum curing times, from about 3.3 to about 61.6 minutes and from about 10.8 to about 78.0 minutes, respectively.

EXAMPLE V

To 110 parts by weight of a standard resin there were added, with vigorous stirring, 1.0 part by weight of 1,1-ditertiary butyl peroxy-3,3,5-trimethyl cyclohexane and 0.065 parts by weight of sulphuric acid. Of the resulting composition the gel time, the minimum curing time and the peak temperature were determined at 60° C. The same measurements were carried out on compositions which only contained the same amount by weight of 1,1-ditertiary butylperoxy-3,3,5-trimethyl cyclohexane, and on the same compositions which contained an acid other than sulphuric acid. The measurements were also carried out on compositions containing a peroxide other than 1,1-ditertiary butylperoxy-3,3,5-trimethyl cyclohexane. The compositions and bath temperatures used in the measurements and the results obtained are listed in Tables V through VII.

TABLE V

| Compositions | % by weight | | | | | | | | | |
|---|---|---|---|---|---|---|---|---|---|---|
| 1,1-ditertiary butyl peroxy-3,3,5-trimethyl cyclohexane | 1.0 | 1.0 | 1.0 | 1.0 | 1.0 | 1.0 | 1.0 | 1.0 | 1.0 | 1.0 |
| sulphuric acid | 0.065 | — | — | — | — | — | — | — | — | — |
| paratoluene sulphonic acid | — | — | 0.235 | — | — | — | — | — | — | — |
| nitric acid | — | — | — | 0.085 | — | — | — | — | — | — |
| triphenyl sulphonium chloride | — | — | — | — | — | — | — | 0.2 | — | — |
| trialkyl benzyl ammonium chloride | — | — | — | — | — | — | — | — | 0.17 | — |
| phosphoric acid | — | — | — | — | 0.037 | — | — | — | — | — |
| phosphorus acid | — | — | — | — | — | 0.045 | — | — | — | — |
| temp. (°C.) | 60 | 60 | 60 | 60 | 60 | 60 | 70 | 70 | 70 | 70 |
| gel time (min.) | 2.9 | 61.6 | 0.8 | 0.76 | 23.4 | 22.0 | 16.4 | 3.1 | 34 | 16.4 |
| minimum curing time (min.) | 7.3 | 78.0 | 1.45 | 1.21 | 28.0 | 26.6 | 20.5 | 4.3 | 4.9 | 20.5 |
| peak temp. (°C.) | 150 | 117 | 202 | 109 | 210 | 207 | 224 | 237 | 232 | 224 |

TABLE VI

| Composition | % by weight | | | | |
|---|---|---|---|---|---|
| 4,4-ditertiary butyl peroxy-valeric n-butyl ester | 1.0 | 1.0 | 1.0 | 1.0 | 1.0 |
| sulphuric acid | — | 0.065 | — | — | — |
| paratoluene sulphonic acid | — | — | 0.235 | — | — |
| nitric acid | — | — | — | 0.085 | — |
| triphenyl sulphonium chloride | — | — | — | — | 0.2 |
| temp. (°C.) | 80 | 80 | 80 | 80 | 80 |
| gel time (min.) | 27.0 | 1.6 | 0.2 | 1.6 | 5.2 |
| curing time (min.) | 33.4 | 66 | 0.95 | 4.6 | 8.1 |
| peak temp (°C.) | 217 | 187 | 204 | 123 | 234 |

TABLE VII

| Composition | % by weight | | | | | | | |
|---|---|---|---|---|---|---|---|---|
| 2,2-dicumyl peroxy propane | 1.0 | 10. | — | — | — | — | — | — |
| 1,1 bis (2,4,4-trimethyl-2-peroxy) cyclohexane | — | — | 1.0 | 1.0 | — | — | — | — |
| 2,2-ditertiary butyl peroxy-4-methyl pentane | — | — | — | — | 1.0 | 1.0 | 1.0 | 1.0 |
| nitric acid | — | — | — | — | 0.085 | — | — | — |
| trialkyl benzyl ammonium chloride | 0.17 | — | 0.7 | — | — | — | 0.17 | — |
| temp (°C.) | 80 | 80 | 70 | 70 | 60 | 60 | 60 | 60 |
| gel time (min.) | 10.40 | 33.80 | 7.10 | 21.10 | 1.1 | 39.5 | 3.8 | 23 |
| minimum curing time (min.) | 12.81 | 37.60 | 9.12 | 23.40 | 1.94 | 43.2 | 5.2 | 28.7 |
| peak temp (°C.) | 227 | 225 | 227 | 222 | 182 | 194 | 233 | 209 |

The contents of Table V through VII demonstrate that the present invention may be practiced with a broad range of both perketals and acid components and that the results of using a given perketal and an acid component are superior to the results obtained from using the perketal alone.

What is claimed is:

1. An improved process for copolymerizing an unsaturated polyester resin which comprises an unsaturated polyester and a reactive monomer containing one or more polymerizable $CH=C<$ groups, in which the improvement comprises performing said copolymerization in the presence of a peroxidic initiator comprising from about 0.1 to about 10 percent, by weight, calculated on the total weight of the resin, of a perketal having the structure

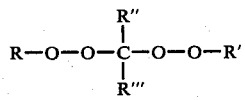

wherein R, R', R'', and R''' are independently selected from the group consisting of substituted or unsubstituted alkyl and aralkyl radicals, the alkyl and aralkyl radicals containing from about 4 to about 12 carbon atoms and R'' and R''', along with the central carbon atom, being capable of forming a substituted or unsubstituted cycloalkyl group, and from about 0.001 to about 5 percent, by weight, calculated on the total weight of the resin, of an acid component which is an acid selected from the group consisting of (1) Bronsted acids having a $pK_a \leq$ formic acid, (2) Lewis acids, (3) metal halides having Lewis acid properties, and (4) acid forming compounds which upon being subjected to solvolysis, heating, or UV radiation, will release a Bronsted acid havng a $pK_a <$ formic acid, selected from the group consisting of triphenyl sulphonium chloride, benzoyl chloride, o-methyl benzoyl chloride, cumyl chloride, and 1,4-bis(α-chloroisopropyl)benzene.

2. The process of claim 1 wherein the perketal has the structure

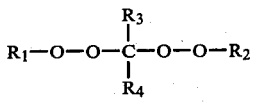

wherein $R_1$ and $R_2$ are independently selected from the group consisting of tertiarybutyl, tertiaryamyl, cumyl, and 2,4,4-trimethyl pentyl-2, and $R_3$ and $R_4$ are either independently selected from the group consisting of substituted or unsubstituted alkyl radicals having from about 1 to about 18 carbon atoms, and aralkyl radicals having from about 7 to about 15 carbon atoms, or, together with the central carbon atoms, form a substituted or unsubstituted cycloalkyl group, having from about 5 to about 16 carbon atoms in the ring.

3. The process of claim 2 wherein the perketal is selected from the group consisting of 1,1-ditertiary butyl peroxy cyclohexane, 2,2-ditertiary butyl peroxy butane, 2-2-ditertiary butyl peroxy-4-methyl pentane, 2,2-dicumylperoxy propane, 2,2-ditertiary butyl peroxy valeric-n-butyl ester, 1,1-bis (2,3,4-trimethyl-pentyl-2-peroxy) cyclohexane.

4. A copolymerizable storage-stable unsaturated polyester resin comprising a solution of an unsaturated polyester dissolved in from about 30 to about 70 percent of a reactive monomer containing one or more polymerizable $CH_2\!=\!C<$ groups, based on the total weight of the solution, into which has been incorporated from about 0.001 to about 5 percent of an acid selected from the group consisting of (1) Bronsted acids having a $pK_a \leq$ formic acid, (2) Lewis acids, (3) metal halides having Lewis acid properties, and (4) acid releasing compounds which upon being subjected to solvolysis, heating, or UV radiation, will release a Bronsted acid having a $pK_a <$ formic acid, selected from the group consisting of triphenyl sulphonium chloride, benzoyl chloride, o-methyl benzoyl chloride, cumyl chloride, and 1,4-bis($\alpha$-chloroisopropyl)benzene and from about 0.1 to 10 percent of a perketal having the structure:

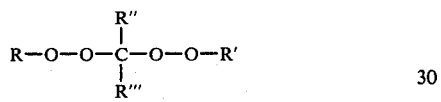

wherein R, R', R", and R'" are independently selected from the group consisting of substituted or unsubstituted alkyl and aralkyl radicals, the alkyl and aralkyl radicals containing from about 4 to about 12 carbon atoms, and R" and R'", along with the central carbon atom, being capable of forming a substituted or unsubstituted cycloalkyl group, both based on the total weight of the polyester resin.

5. A copolymerizable unsaturated polyester resin comprising:
a. an unsaturated polyester,
b. a reactive monomer containing one or more polymerizable $CH_2\!=\!C<$ groups,
c. from about 0.1 to about 10 percent, by weight, calculated on a total weight of the resin, of a perketal having the structure:

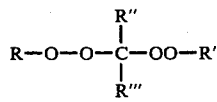

wherein R, R', R", and R'" are independently selected from the group consisting of substituted or unsubstituted alkyl and aralkyl radicals, the alkyl and aralkyl radicals containing from about 4 to about 12 carbon atoms and R" and R'", along with the central carbon atom, being capable of forming a substituted or unsubstituted cycloalkyl group, and
d. from about 0.001 to about 5 percent, by weight, calculated on the total weight of the resin, of an acid selected from the group consisting of (1) Bronsted acids having a $pK_a \leq$ formic acid, (2) Lewis acids, (3) metal halides having Lewis acid properties, and (4) acid forming compounds which upon being subjected to solvolysis, heating, or UV radiation, will release a Bronsted acid having a $pK_a <$ formic acid, selected from the group consisting of triphenyl sulphonium chloride, benzoyl chloride, o-methyl benzoyl chloride, cumyl chloride, and 1,4-bis($\alpha$-chloroisopropyl)benzene.

6. The resin of claim 5 wherein R" and R'", together with the central carbon atom represent a substituted or unsubstituted cycloalkyl group, having from about 5 to about 16 carbon atoms in the ring.

7. The resin of claim 6 wherein R and R' are independently selected from the group consisting of tertiary butyl and tertiary amyl.

8. The resin of claim 5 wherein R and R' are independently selected from the group consisting of tertiary butyl and tertiary amyl.

9. A copolymerizable unsaturated polyester resin comprising:
a. an unsaturated polyester,
b. a reactive monomer containing one or more polymerizable $CH_2\!=\!C<$ groups,
c. from about 0.1 to about 10 percent, by weight, calculated on a total weight of the resin, of a 1,1-ditertiary butyl peroxy cyclohexane,
d. from about 0.001 to about 5 percent, by weight, calculated on the total weight of the resin, of an acid selected from the group consisting of (1) Bronsted acids having a $pK_a \leq$ formic acid, (2) Lewis acids, (3) metal halides having Lewis acid properties, and (4) acid forming compounds which upon being subjected to solvolysis, heating, or UV radiation, will release a Bronsted acid having a $pK_a <$ formic acid, selected from the group consisting of triphenyl sulphonium chloride, benzoyl chloride, o-methyl benzoyl chloride, cumyl chloride, and 1,4-bis($\alpha$-chloroisopropyl)benzene.

10. A process for accelerating the copolymerization of an unsaturated polyester resin which comprises a solution of an unsaturated polyester in a reactive monomer containing one or more polymerizable $CH_2\!=\!C<$ groups in the presence of from 0.1 to about 10 percent, by weight, calculated on a total weight of the resin, of a perketal having the structure

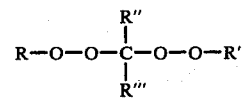

wherein R, R', R", and R'" are independently selected from the group consisting of substituted or unsubstituted alkyl and aralkyl radicals, the alkyl and aralkyl radicals containing from about 4 to about 12 carbon atoms and R" and R'", along with the central carbon atom, being capable of forming a substituted or unsubstituted cycloalkyl group, and further containing a gelation inhibitor, which process comprises incorporating into the resin from about 0.001 to about 5 percent, by weight, calculated on the total weight of the resin, of an acid selected from the group consisting of (1) Bronsted acids having a $pK_a \leq$ formic acid, (2) Lewis acids, (3) metal halides having Lewis acid properties, and (4) acid forming compounds which upon being subjected to solvolysis, heating, or UV radiation, will release a Bronsted acid having a $pK_a <$ formic acid, selected from the group consisting of triphenyl sulphonium chloride, benzoyl chloride, o-methyl benzoyl chloride, cumyl chloride, and 1,4-bis($\alpha$-chloroisopropyl)benzene.

* * * * *